United States Patent
Theil et al.

(10) Patent No.: US 12,305,326 B2
(45) Date of Patent: May 20, 2025

(54) METHOD FOR COATING A TEXTILE MEDIUM

(71) Applicant: Elkem Silicones France SAS, Lyons (FR)

(72) Inventors: Perrine Theil, St Pierre de Chandieu (FR); Emmanuel Pouget, Bron (FR); Magali Puillet, Lyons (FR)

(73) Assignee: Elkem Silicones France SAS, Lyons (FR)

( * ) Notice: Subject to any disclaimer, the term of this patent is extended or adjusted under 35 U.S.C. 154(b) by 364 days.

(21) Appl. No.: 18/007,010

(22) PCT Filed: Jul. 26, 2021

(86) PCT No.: PCT/FR2021/000081
§ 371 (c)(1),
(2) Date: Jan. 26, 2023

(87) PCT Pub. No.: WO2022/023622
PCT Pub. Date: Feb. 3, 2022

(65) Prior Publication Data
US 2023/0295869 A1    Sep. 21, 2023

(30) Foreign Application Priority Data

Jul. 30, 2020    (FR) ..................... 2008079

(51) Int. Cl.
| | |
|---|---|
| *D06M 15/643* | (2006.01) |
| *C08G 77/12* | (2006.01) |
| *C08G 77/20* | (2006.01) |
| *C08L 83/04* | (2006.01) |
| *C09D 183/04* | (2006.01) |
| *D06M 10/00* | (2006.01) |
| *D06M 10/10* | (2006.01) |
| *D06M 11/79* | (2006.01) |

(52) U.S. Cl.
CPC ........... *D06M 15/643* (2013.01); *C08G 77/12* (2013.01); *C08G 77/20* (2013.01); *C08L 83/04* (2013.01); *C09D 183/04* (2013.01); *D06M 10/001* (2013.01); *D06M 10/10* (2013.01); *D06M 11/79* (2013.01)

(58) Field of Classification Search
USPC ........................................ 525/477, 478, 479
See application file for complete search history.

(56) References Cited

U.S. PATENT DOCUMENTS

| | | | |
|---|---|---|---|
| 7,972,705 | B2 | 7/2011 | Branlard et al. |
| 8,465,807 | B2 | 6/2013 | Maliverney et al. |
| 8,475,873 | B2 | 7/2013 | Maliverney |
| 8,796,161 | B2 | 8/2014 | Defaux et al. |
| 10,174,177 | B2 | 1/2019 | Feder et al. |
| 10,676,574 | B2 | 6/2020 | Borecki et al. |
| 10,702,625 | B2 | 7/2020 | Moine et al. |
| 2012/0164406 | A1 | 6/2012 | Defaux |
| 2013/0323428 | A1 | 12/2013 | Ochs |

FOREIGN PATENT DOCUMENTS

| | | |
|---|---|---|
| CN | 1890426 A | 1/2007 |
| CN | 101432366 A | 5/2009 |
| CN | 101501270 A | 8/2009 |
| CN | 102458166 A | 5/2012 |
| EP | 0154723 A1 | 9/1985 |
| GB | 2399519 A | 9/2004 |
| JP | H05222143 A | 8/1993 |
| JP | 2018003194 A | 1/2018 |
| WO | 0245697 A2 | 6/2002 |
| WO | 03066960 A1 | 8/2003 |
| WO | 2007/112982 A1 | 10/2007 |
| WO | 2010/139868 A1 | 12/2010 |
| WO | 2010/146249 A1 | 12/2010 |
| WO | 2010/146250 A1 | 12/2010 |
| WO | 2013/103537 A | 7/2013 |
| WO | 2015/158967 A1 | 10/2015 |
| WO | 2016/207498 A1 | 12/2016 |
| WO | 2017/051085 A1 | 3/2017 |

OTHER PUBLICATIONS

Han Zhiyue et al.,, "Pyrotechnic Gas Generating Agent Technology", Beijing: Beijing Institute of Technology Press, 2020, 4 ISBN 978-7-5682-8314-4, China National Library of Publications CIP Data Verification No. (2020) 051802.
International Search Report of International patent Application No. PCT/FR2021/000081, mailed Dec. 3, 2021.

*Primary Examiner* — Arti Singh-Pandey
(74) *Attorney, Agent, or Firm* — McBee, Moore & Vanik IP, LLC

(57) ABSTRACT

The present invention relates to a coating method wherein a silicone composition crosslinkable by polyaddition reactions is used to form a silicone elastomer on an open-work and/or elastic textile medium. The crosslinking of the silicone composition is obtained by irradiating with UV radiation, the source of which is a UV-LED lamp.

10 Claims, No Drawings

METHOD FOR COATING A TEXTILE MEDIUM

CROSS-REFERENCE TO RELATED APPLICATIONS

This application is the National Stage entry of International Application No. PCT/FR2021/000081, filed 26 Jul. 2021, which claims priority to French Patent Application No. 2008079, filed 30 Jul. 2020.

BACKGROUND

Field

The present invention relates to a method for coating an open-work or elastic textile medium with a silicone composition which is crosslinkable by polyaddition reactions, by irradiation with UV radiation, the source of which is a UV-LED lamp.

Description of Related Art

It is known to use silicone compositions to coat textile materials in order to obtain properties of adhesion on the skin and non-slip properties, particularly for certain items of clothing, hygiene items and medical devices. The textiles thus obtained, as is or converted into textile items, can be used in numerous applications, for example in the field of clothing, particularly lingerie such as lace for tops or bottoms or bras, hygiene items, and medical devices, such as compression bandages or dressings.

Patent applications WO 2007/112982 and WO 2010/139868 describe methods for coating a textile surface with an elastomeric silicon composition which is crosslinkable by polyaddition. The aim of said silicone composition s is to give the textile a non-slip property. The silicone composition is obtained by coating the fibrous medium then curing which arises from the polyaddition of the unsaturated groups, typically alkenyl groups, of a polyorganosiloxane to the hydrogens of the same or of another polyorganosiloxane. In order for the curing of the coated compositions to take place, particularly when thin layers are desired, it is necessary to provide thermal energy by means of ovens, the operating temperatures of which may reach 210° C., or by means of high-pressure lamps emitting electromagnetic or infrared radiation. These techniques make it possible to achieve quick crosslinking times (less than a minute for some applications) and thus to use quick coating speeds which, depending on the applications, may be of the order of several tens of meters per minute.

However, these coating techniques consume a large amount of energy. Moreover, the temperature range required to crosslink this type of liquid composition so as to form a thin layer does not enable application to all types of flexible media, particularly those which are sensitive to any increase in the temperature of the ambient environment. Examples of flexible media which are fragile when confronted with a temperature increase are flexible media made of thermoplastic materials having glass transition temperatures of less than 100° C., or textile lace.

In order to coat fragile substrates, it is therefore necessary to limit the crosslinking treatment temperature. Crosslinking by polyaddition is therefore slower, impacting productivity and production costs. It is for these reasons that liquid silicone compositions which crosslink by condensation reactions remain highly attractive for this type of application. They afford the possibility of crosslinking at ambient temperature when they are exposed to air humidity. Mention may for example be made of the patent applications WO 2010/146249, WO 2010/146250 and WO 2015/158967 which describe methods for coating a flexible medium, particularly a textile flexible medium, with an elastomeric silicone composition which is crosslinkable by polycondensation. For low-temperature crosslinking, use may also be made of RTV-1 technologies ("Room Temperature Vulcanising", packaged in a single pack), based on alkoxysilane or acetoxysilane. Nevertheless, during crosslinking, these compositions generate volatile organic compounds such as acetic acid or alcohol, which may be an unacceptable disadvantage.

Moreover, silicone formulations crosslinked under UV by polyaddition are described in the literature. Mention may for example be made of Japanese patent JP 06-531724 B2, which describes a method for manufacturing an airbag textile coated with a silicone elastomer which is UV-crosslinkable. This method consists in depositing a silicone composition on the textile material then in irradiating the coated surface with UV. However, such a method and the silicone composition used were developed to respond to the problem of the adhesion of the silicon coating on the airbag textile and to the problem of wrinkle formation on the surface of the coating. Fabrics for airbags in no way have the same technical properties as elastic or open-work fabrics such as lace or elastic strips. Moreover, the end properties sought for the coating of an airbag fabric are entirely different from non-slip properties and properties of adhesion to the skin sought for a clothing or hygiene fabric.

One aim of the present invention is to propose a method for coating a silicone fabric suitable for a textile medium which is fragile when confronted with a temperature increase. Another aim is to propose a coating method for which the coating rate is high, which makes it possible to achieve better productivity. Moreover, it is desirable for the method to consume little energy, for better production costs and reduced environmental impact.

Furthermore, it is desired for the textile medium thus coated with the silicone elastomer to have good properties in terms of the end use, particularly properties of adhesion to the skin and non-slip properties. It is also necessary to ensure that, after coating and crosslinking the silicone composition on the textile, there are no phenomena of releasing oily substances which could stain the textile and/or the packaging thereof. This silicone composition must also be non-toxic and odorless. It is also desired for the coating to be able to withstand washing and friction, and for it to have good resistance to elongation when the textile material is handled.

SUMMARY

A subject of the present invention is therefore a method for coating a silicone x which composition is crosslinkable by polyaddition reactions to forma silicone elastomer on an open-work and/or elastic textile medium S, comprising the following steps a), b) and c):

a) a silicone composition X which is crosslinkable by polyaddition reactions is provided, comprising:
   at least one organopolysiloxane A having, per molecule, at least two $C_2$-$C_6$ alkenyl groups bonded to the silicon,
   at least one organopolysiloxane B having, per molecule, at least two SiH units, and a catalytically effective amount of at least one hydrosilylation catalyst C, which is activatable by UV irradiation, b) said silicone composition X is deposited continuously or discontinuously on at least one face of said textile medium S, and c) said silicone composition X is crosslinked by irradiation with UV radiation, the source of which is a UV-LED lamp.

The textile medium S coated on at least one face with a silicone elastomer which can be obtained by the method as defined above is also a subject of the present invention. Moreover, another subject of the invention is the use of said coated textile medium S in the field of clothing, particularly lingerie such as lace for tops, bottoms, or bras, and sports clothing, hygiene items, and medical devices, such as compression bandages or dressings.

DETAILED DESCRIPTION OF A PREFERRED EMBODIMENT

In the present text, "UV" means ultraviolet. Ultraviolet radiation is defined as electromagnetic radiation having a wavelength of between approximately 100 nm and approximately 400 nm, i.e. shorter than the visible light spectrum.

Moreover, in the present text, "LED" is the acronym, well-known to those skilled in the art, for "light-emitting diode".

Unless indicated otherwise, all the viscosities of the silicone oils in question in the present disclosure correspond to a dynamic viscosity magnitude at 25° C., referred to as "Newtonian" viscosity, i.e. the dynamic viscosity which is measured, in a manner known per se, using a Brookfield viscometer at a sufficiently low shear gradient for the viscosity measured to be independent of the velocity gradient.

A subject of the present invention is therefore a method for coating a silicone composition X which is crosslinkable by polyaddition reactions to form a silicone elastomer on an open-work and/or elastic textile medium S.

In the present description, the term "textile" is a generic term encompassing all textile structures. Textiles may consist of threads, fibers, filaments and/or other materials. They particularly comprise flexible fabrics, whether they are woven, adhesively bonded, knitted, braided, made of felt, needled or sewn, or produced by another manufacturing method. "Thread" means for example a continuous multifilament object, a continuous thread obtained by assembling several threads or a spun thread of continuous fibers, obtained from a single fiber type or from a mixture of fibers. "Fiber" means for example a short or long fiber, a fiber intended to be worked by spinning or for the manufacture of nonwoven items, or a rope intended to be cut up to form short fibers. The textile may perfectly well consist of threads, fibers and/or filaments which have undergone one or more treatment steps before producing the textile surface, for example steps of texturing, drawing, draw-texturing, sizing, relaxing, heat-setting, twisting, fixing, curling, washing and/or dyeing.

According to the invention, any type of textile can be used. By way of indication, mention may be made of:

natural textiles such as: textiles of plant origin, such as cotton, linen, hemp, jute, coir, cellulose paper fibers; and textiles of animal origin, such as wool, fur, leather and silks;

man-made textiles such as: cellulose textiles, such as cellulose or derivatives thereof; and protein-based textiles of animal or plant origin; and synthetic textiles such as polyester, polyamide, polymallic alcohols, polyvinyl chloride, polyacrylonitrile, polyolefins, acrylonitrile, butadiene-styrene-(meth)acrylate copolymers, and polyurethane.

Synthetic textiles obtained by polymerization or polycondensation may particularly comprise, in the matrix thereof, different types of additives such as pigments, delustrants, mattifying agents, catalysts, heat and/or light stabilizers, anti-stats, flame retardants, antibacterial, antifungal and/or anti-mite agents.

As type of textile surfaces, mention may particularly be made of surfaces obtained by the rectilinear intertwining of the threads or fabrics, surfaces obtained by the curvilinear interlacing of threads or knits, mixtilinear surfaces or tulles, nonwoven surfaces and composite surfaces.

The textile medium used in the method of the present invention may consist of one or more identical or different textiles assembled in various ways. The textile may be single-layer or multilayer. The textile medium may for example consist of a multilayer structure which can be produced by various assembly means, such as mechanical means like sewing, welding, or spot or continuous adhesive bonding.

The textile medium can, in addition to the coating method according to the present invention, undergo one or more other subsequent treatments, also referred to as finishing or refining treatment. These other treatments may be carried out before, after and/or during said coating method of the invention. As other subsequent treatments, mention may particularly be made of: dyeing, printing, laminating, coating, assembling with other textile surfaces or materials, washing, degreasing, preforming or fixing.

The textile medium S according to the present invention is an open-work and/or elastic textile medium. The textile support according to the invention is preferably open-work and elastic.

A textile is said to be "open-work" when it comprises open spaces which do not consist of textile. Said open spaces (which can be called pores, voids, alveola, holes, interstices or orifices) can be distributed regularly or irregularly over the textile. These open spaces may particularly be created during the production of the textile. In order for the coating of the silicone composition of the invention to be effective, it is preferably for the smallest of the dimensions of these open spaces to be less than 5 mm, particularly less than 1 mm.

A textile is said to be "elastic" when it has a degree of elasticity of greater than 5%, preferably greater than 15%. The degree of elasticity of a textile can typically range up to 500%. The degree of elasticity represents the percentage elongation of the textile when it is stretched as much as possible. The elongation may be only longitudinal, only transverse, or longitudinal and transverse.

According to a preferred embodiment of the invention, the textile medium is lace or an elastic strip.

In a first step (a) of the method which is a subject of the present invention, a silicone composition X which is crosslinkable by polyaddition reactions is provided, comprising:

at least one organopolysiloxane A having, per molecule, at least two $C_2$-$C_6$ alkenyl groups bonded to the silicon, at least one organopolysiloxane B having, per molecule, at least two SiH units, and a catalytically effective amount of at least one hydrosilylation catalyst C, which is activatable by UV irradiation.

The organopolysiloxane A having, per molecule, at least two $C_2$-$C_6$ alkenyl groups bonded to the silicon, may particularly be formed:

of at least two siloxyl units of the following formula:

$$Y_a R^1_b SiO_{(4-a-b)/2} \text{ in which:}$$

Y is a $C_2$-$C_6$ alkenyl, preferably vinyl, $R^1$ is a monovalent hydrocarbon-based group having from 1 to 12 carbon atoms, preferably selected from alkyl groups having from 1 to 8 carbon atoms such as methyl, ethyl, propyl groups, cycloalkyl groups having from 3 to 8 carbon atoms and aryl groups having from 6 to 12 carbon atoms, and a=1 or 2, b=0, 1 or 2 and the sum a+b=1, 2 or 3; and optionally units of the following formula: $R^1_c SiO_{(4-c)/2}$ in which RE has the same meaning as above and c=0, 1, 2 or 3.

It is understood in the above formulas that, if several $R^1$ groups are present, they may be identical to or different from one another.

These organopolysiloxanes A may have a linear structure, essentially consisting of siloxyl units "D" selected from the group consisting of the siloxyl units $Y_2SiO_{2/2}$, $YR^1SiO_{2/2}$ and $R^1_2SiO_{2/2}$, and of terminal siloxyl units "M" selected from the group consisting of the siloxyl units $YR^1_2SiO_{1/2}$, $Y_2R^1SiO_{1/2}$ and $R^1_3SiO_{1/2}$. The symbols Y and R' are as described above.

By way of examples of terminal "M" units, mention may be made of trimethylsiloxy, dimethylphenylsiloxy, dimethylvinylsiloxy or dimethylhexenylsiloxy groups.

By way of examples of "D" units, mention may be made of dimethylsiloxy, methylphenylsiloxy, diphenylsiloxy, methylbutenylsiloxy, methylvinylsiloxy, methylhexenylsiloxy, methyldecenylsiloxy or methyldecadienylsiloxy.

Examples of linear organopolysiloxanes which can be the organopolysiloxanes A according to the invention are:

a poly(dimethylsiloxane) having dimethylvinylsilyl ends;

a poly(dimethylsiloxane-co-methylphenylsiloxane) having dimethylvinylsilyl ends;

a poly(dimethylsiloxane-co-methylvinylsiloxane) having dimethylvinylsilyl ends;

a poly(dimethylsiloxane-co-methylvinylsiloxane) having trimethylsilyl ends; and a cyclic poly(methylvinylsiloxane).

In the most recommended form, the organopolysiloxane A contains terminal dimethylvinylsilyl units, and the organopolysiloxane A is preferentially a poly(dimethylsiloxane) having dimethylvinylsilyl ends.

A silicone oil generally has a viscosity of between 1 mPa·s and 2 000 000 mPa·s. Preferably, said organopolysiloxanes A are oils having a dynamic viscosity of between 20 mPa·s and 300 000 mPa·s, preferably between 100 mPa·s and 200 000 mPa·s at: 25° C., and more preferentially between 600 mPa·s and 150 000 mPa·s.

Optionally, the organopolysiloxanes A can additionally contain siloxyl units "T" ($R^1SiO_{3/2}$) and/or siloxyl units "Q" ($SiO_{4/2}$). The symbols R' are as described above. The organopolysiloxanes A thus have a branched structure. Examples of branched organopolysiloxanes which can be the organopolysiloxanes A according to the invention are:

a poly(dimethylsiloxane)(methylsiloxane) having trimethylsilyl and dimethylvinylsilyl ends, consisting of trimethylsiloxy units "M", dimethylvinylsiloxy units "M", dimethylsiloxy units "D" and methylsiloxy units "T";

a resin consisting of trimethylsiloxy units "M", dimethylvinylsiloxy units "M" and "Q", and a resin consisting of trimethylsiloxy units "M", methylvinylsiloxy units "D" and "Q".

Nevertheless, according to one embodiment, the silicone composition X does not comprise branched organopolysiloxanes or resins comprising $C_2$-$C_6$ alkenyl units.

Preferably, the organopolysiloxane compound A has a content by weight of alkenyl units of between 0.001% and 30%, preferably between 0.01% and 10%, preferably between 0.02 and 5%.

The silicone composition X preferably comprises from 50% to 90% of organopolysiloxane A, more preferentially from 60% to 87% by weight of organopolysiloxane A, and even more preferentially from 70% to 85% by weight of organopolysiloxane A relative to the total weight of the silicone composition X.

The silicone composition x may comprise a single organopolysiloxane A or a mixture of several organopolysiloxanes A, having for example different viscosities and/or different structures.

According to a preferred embodiment, the silicone composition X may comprise a mixture:

of at least one organopolysiloxane compound A having, per molecule, at least two $C_2$-$C_6$ alkenyl groups bonded to the silicon, as described above; and of at least one organopolysiloxane compound A' having, per molecule, a single $C_2$-$C_6$ alkenyl group bonded to the silicon.

The presence of a monoalkenylated polyorganosiloxane in the silicone composition X may advantageously improve the level of adhesion to the skin of the coated textile according to the invention. Examples of monoalkenylated organopolysiloxanes which can be the organopolysiloxanes A' according to the invention are:

a poly(dimethylsiloxane) having a dimethylvinylsilyl end and a trimethylsilyl end;

a poly(dimethylsiloxane-co-methylvinylsiloxane) having trimethylsilyl ends.

According to this embodiment, the silicone composition x preferably comprises from 4% to 20% of monoalkenylated organopolysiloxane A', more preferentially from 8% to 18% by weight of monoalkenylated organopolysiloxane A', and even more preferentially from 10% to 15% by weight of monoalkenylated organopolysiloxane A' relative to the total weight of the silicone composition X.

The organopolysiloxane B is an organohydropolysiloxane comprising, per molecule, at least two, and preferably at least three, hydrosilyl functions or Si—H units.

The organohydropolysiloxane B may advantageously be an organopolysiloxane comprising at least two, preferably at least three, siloxyl units of the following formula:

$$H_d R^2_e SiO_{(4-d-e)/2}$$

in which:

the radicals $R^2$, which are identical or different, represent a monovalent radical having from 1 to 12 carbon atoms, d=1 or 2, e=0, 1 or 2 and d+e=1, 2 or 3;

and optionally other units of the following formula:

$$R^2_f SiO_{(4-f)/2}$$

in which $R^2$ has the same meaning as above and f=0, 1, 2 or 3.

It is understood in the above formulas that, if several $R^2$ groups are present, they may be identical to or different from one another. Preferentially, $R^2$ may represent a monovalent radical selected from the group consisting of alkyl groups having 1 to 8 carbon atoms, optionally substituted with at least one halogen atom such as chlorine or fluorine, cycloalkyl groups having 3 to 8 carbon atoms and aryl groups having 6 to 12 carbon atoms. $R^2$ may advantageously be selected from the group consisting of methyl, ethyl, propyl, 3,3,3-trifluoropropyl, xylyl, tolyl and phenyl.

In the above formula, the symbol d is preferentially equal to 1.

The organohydropolysiloxane B may have a linear, branched or cyclic structure. The degree of polymerization is preferably greater than or equal to 2. Generally, it is less than 5000.

When the polymers are linear, they essentially consist of siloxyl units selected from units of the following formulas D: $R^2{}_2SiO_{2/2}$ or D': $R^2HSiO_{2/2}$, and of terminal siloxyl units selected from units of the following formulas M: $R^2{}_3SiO_{1/2}$ or M': $R^2{}_2HSiO_{1/2}$ where $R^2$ has the same meaning as above.

Examples of organohydropolysiloxanes which can be the organopolysiloxanes B according to the invention comprising at least two hydrogen atoms bonded to a silicon atom are:
- a poly(dimethylsiloxane) having hydrodimethylsilyl ends;
- a poly(dimethylsiloxane-co-methylhydrosiloxane) having trimethylsilyl ends;
- a poly(dimethylsiloxane-co-methylhydrosiloxane) having hydrodimethylsilyl ends;
- a poly(methylhydrosiloxane) having trimethylsilyl ends; and
- a cyclic poly(methylhydrosiloxane).

When the organohydropolysiloxane B has a branched structure, it is preferably selected from the group consisting of silicone resins of the following formulas:
- M'Q in which the hydrogen atoms bonded to silicon atoms are borne by the groups M,
- MM'Q in which the hydrogen atoms bonded to silicon atoms are borne by a portion of the units M,
- MD'Q in which the hydrogen atoms bonded to silicon atoms are borne by the groups D,
- MDD'Q in which the hydrogen atoms bonded to silicon atoms are borne by a portion of the groups D,
- MM'TQ in which the hydrogen atoms bonded to silicon atoms are borne by a portion of the units M,
- MM'DD'Q in which the hydrogen atoms bonded to silicon atoms are borne by a portion of the units M and D, and mixtures thereof, with M, M', D and D' as defined previously, T: siloxyl unit of formula $R^2{}_3SiO_{1/2}$ and Q: siloxyl unit of formula $SiO_{4/2}$ where $R^2$ has the same meaning as above.

Preferably, the organohydropolysiloxane compound B has a content by weight of hydrosilyl functions Si—H of between 0.2% and 91%, more preferentially between 3% and 80%. Taking into consideration the whole of the silicone composition X, the molar ratio of the hydrosilyl functions Si—H to the alkene functions may advantageously be between 0.2 and 20, preferably between 0.5 and 15, more preferentially between 0.5 and 10, and even more preferentially between 0.5 and 5.

Preferably, the viscosity of the organohydropolysiloxane B is between 1 mPa·s and 5000 mPa·s, more preferentially between 1 mPa·s and 2000 mPa·s, and even more preferentially between 5 mPa·s and 1000 mPa·s.

The silicone composition X preferably comprises from 0.1% to 10% of organohydropolysiloxane B, and more preferentially from 0.5% to 5% by weight, relative to the total weight of the silicone composition X.

The silicone composition x may comprise a single organohydropolysiloxane B or a mixture of several organohydropolysiloxanes B, having for example different viscosities and/or different structures.

According to a preferred embodiment, the silicone composition X may comprise a mixture:
- of at least one organohydropolysiloxane B as described above, comprising two SiH functions per molecule, and
- of at least one organohydropolysiloxane B as described above, comprising at least three SiH functions per molecule.

The presence of a monoalkenylated polyorganosiloxane in the silicone composition X may advantageously improve the level of adhesion to the skin of the coated textile according to the invention. The organohydropolysiloxane B comprising two SiH functions per molecule serves as chain extender. The organohydropolysiloxane B comprising at least three SiH functions per molecule serves as crosslinker.

The hydrosilylation catalyst C according to the present invention has the particular feature of being activatable by UV irradiation. It is an essentially inactive compound in the absence of irradiation. When it is subjected to UV irradiation, preferably at a wavelength of between 200 nm and 400 nm, it becomes activated and becomes a hydrosilylation catalyst which enables the reaction between the alkenyl groups of the organopolysiloxane A and the hydrosilyl functions of the organopolysiloxane B.

The hydrosilylation catalyst C according to the present invention is preferably a platinum compound. It may particularly be selected from β-diketonate platinum complexes, η-5-cyclopentadienyl trialkyl platinum complexes, or derivatives thereof. Mention may be made, for example, of: trimethylplatinum(IV)acetylacetonate, trimethylplatinum(IV)(3,5-heptanedionate), trimethylplatinum(IV)(methylacetoacetate), trimethylplatinum(IV)(2,4-pentanedionate), platinum(II)bis(acetylacetonate), platinum(II)bis(2,4-pentanedioate), platinum(II)bis(2,4-hexanedionate), platinum(II)bis(2,4-heptanedionate), platinum(II)bis(3,5-heptanedionate), platinum(II)bis(1-phenyl-1,3-butanedionate), platinum(II)bis(1,3-diphenyl-1,3-propanedionate), platinum(II)bis(hexafluoroacetylacetonate), trimethylplatinum(IV)(methylcyclopentadienyl), trimethylplatinum(IV)(pentamethylcyclopentadienyl), trimethylplatinum(IV)(cyclopentadienyl), trimethylplatinum(IV)(1,2,3,4,5-pentamethylcyclopentadienyl), dimethylethylplatinum(IV)(cyclopentadienyl), dimethylacetylplatinum(IV)(cyclopentadienyl), trimethylplatinum(IV)(trimethylsilylcyclopentadienyl), trimethylplatinum(IV)(methoxycarbonylcyclopentadienyl), trimethylcyclopentadienylplatinum(IV)(dimethylphenylsilylcyclopentadienyl), and mixtures thereof. More preferably, the hydrosilylation catalyst C may be selected from platinum(II)bis(acetylacetonate), trimethylplatinum(IV)(methylcyclopentadienyl), trimethylplatinum(IV)(trimethylsilylcyclopentadienyl), and mixtures thereof.

The hydrosilylation catalyst C is preferably used dissolved beforehand in a suitable solvent. Nevertheless, this does not rule out using it in solid form.

The catalytically effective amount of catalyst C is generally between 2 ppm and 400 ppm by weight, preferably between 5 ppm and 200 ppm by weight, calculated by weight of metal, based on the total weight of the silicone composition X.

Although not ruled out, the presence of an additional hydrosilylation catalyst which can be activated in the conventional thermal manner is not indispensable in the silicone composition x. Preferably, the silicone composition X according to the invention does not contain a hydrosilylation catalyst which can be activated in the conventional thermal manner. In particular, it does not contain a Karstedt's platinum catalyst.

According to one embodiment, the silicone composition x according to the present invention may optionally comprise a photosensitizer. A photosensitizer may be selected from molecules which absorb wavelengths different from those absorbed by the catalyst C, in order thereby to to extend its spectral sensitivity. There are a large number of photosensitizers which are well known to those skilled in the art. Mention may be made of: anthracene, pyrene, phenothiazine, Michler's ketone, xanthones, thioxanthones, benzophenone, acetophenone, carbazole derivatives, fluorenone, anthraquinone, camphorquinone or acylphosphine oxides. These photosensitizers, and others, are described for example in patent application US 2015/0232700 A1.

When it is present in the composition, the photosensitizer can be added to an amount of 0.05% to 10%, preferably between 0.1 and 2%, by weight relative to the total weight of the silicone composition X. However, the presence of a photosensitizer is not indispensable in the silicone composition X. Preferably, the silicone composition X according to the invention does not contain a photosensitizer.

In addition to the components A, B and C already mentioned above, the silicone composition X according to the present invention may optionally comprise other components.

According to one embodiment, the silicone composition x according to the present invention may optionally comprise a filler D, preferentially a reinforcing filler or a bulking filler.

The reinforcing fillers are preferentially fumed silicas or precipitated silicas. The mineral fillers of silica type preferentially have a specific surface area, measured according to BET methods, of at least 50 m²/g, particularly of between 50 m²/g and 400 m²/g, preferably greater than 70 m²/g, an average dimension of the primary particles of less than 0.1 µm (micrometer) and a bulk density of less than 200 g/liter.

The mineral fillers of silica type, preferably hydrophilic, can be incorporated as is into the silicone composition x or can be optionally treated with a compatibilizer. According to one variant, these silicas can optionally be treated with one or more organosilicon compounds, for example organosilane or organosilazane, which are customarily used for this purpose. These compounds include methylpolysiloxanes such as hexaméehyldisiloxane, methylpolysilazanes octamethylcyclotetrasiloxane, such as hexamethyldisilazane, hexamethylcyclotrisilazane, tetramethyldivinyldisilazane, chlorosilanes such as dimethyldichlorosilane, trimethylchlorosilane, methylvinyldichlorosilane, dimethylvinylchlorosilane, alkoxysilanes such as dimethyldimethoxysilane, dimethylvinylethoxysilane, trimethylmethoxysilane. These compounds may be used alone or as a mixture.

The silica may optionally be pre-dispersed in a silicone oil, so as to obtain a suspension. Preference is particularly given to using a suspension of fumed silica treated particularly by hexamethyldisilazane, in a polyorganosiloxane oil, particularly a vinylated polyorganosiloxane oil.

The silicone composition X preferably comprises from 5% to 20% of filler D, and more preferentially from κ% to 18% by weight of filler D, relative to the total weight of the silicone composition x.

In addition to the silica preferred as filler D, it is also possible to add, to the silicone composition x, other types of filler, particularly bulking fillers, for example ground quartz, diatomaceous earths, calcium carbonate and/or kaolin.

According to one embodiment, the silicone composition X according to the present invention may optionally comprise at least one unreactive polyorganosiloxane compound E, particularly in oil or resin form, generally in order to adjust the viscosity of the composition or to serve as diluent. This polyorganosiloxane compounds E does not comprise any reactive groups of alkenylsilyl and/or hydrosilyl type.

The polyorganosiloxane compound E may advantageously be an organopolysiloxane comprising:
  siloxyl terminal units of type $M=R^3_3SiO_{1/2}$, and
  siloxyl units, which are identical or different, of type $D=R^3_2SiO_{2/2}$,
  and optionally other units of the following formula:

$$R^3_f SiO_{(4-f)/2}$$

in which the radicals $R^3$, which are identical or different, represent a monovalent radical having from 1 to 12 carbon atoms, and $f=0$ or 1.

It is understood in the above formulas that, if several $R^3$ groups are present, they may be identical to or different from one another.

Advantageously, the unreactive polyorganosiloxane compound E is an oil of dimethylpolysiloxane having trimethylsilyl ends.

According to one embodiment, the silicone composition x according to the present invention may optionally comprise other additives conventionally used in this technical field by those skilled in the art, for example dyes, pigments, flame-resistance agents, bactericides, mineral or organic pigments, etc.

A crosslinking inhibitor is generally present in silicone compositions which crosslink by polyaddition. The function of the crosslinking inhibitor is to slow down the hydrosilylation reaction. Mention may be made, by way of examples, of the following commercially available products: 1-ethynyl-1-cyclohexanol, methyl-3-dodecyn-1-ol-3, trimethyl-3,7,11-dodecyn-1-ol-3, diphenyl-1,1-propyn-2-ol-1, ethyl-3-ethyl-6-nonyn-1-ol-3 and methyl-3-pentadecyn-1-ol-3.

However, the presence of a crosslinking inhibitor is not indispensable in the silicone composition X according to the present invention insofar as the hydrosilylation catalyst C is activated by UV irradiation. Preferably, the silicone composition X according to the invention does not contain a crosslinking inhibitor. In particular, it does not contain 1-ethynyl-1-cyclohexanol (ECH).

Typically, an adhesion-promoting compound may be present in the silicone compositions when they are intended to serve as a coating on smooth and dense surfaces. An adhesion promoter may be an organosilicon compound comprising an adhesion-promoting functional group. In particular, it may be an organosilicon compound comprising:
  one or more hydrolyzable groups bonded to the silicon atom, in general alkoxy groups bonded to the silicon atoms, and
  one or more organic groups selected from mercaptan groups, the urea group, the isocyanurate group, (meth)acrylate, epoxy and alkenyl radicals.

Mention may for example be made of the following compounds, taken alone or as a mixture: vinyltrimethoxysilane (VTMO), 3-glycidoxypropyltrimethoxysilane (GLYMO), methacryloxypropyltrimethoxysilane (MEMO), $[H_2N(CH_2)_3]Si(OCH_3)_3$, $[H_2N(CH_2)_4]Si(OCH_3)_3$, $[H_2N(CH_2)_3]Si(OCH_2CH_2CH_3)_3$, $[H_2N(CH_2)_3]Si(OC_2H_3)_3$,

[H$_2$NCH$_2$CH(CH$_3$)CH$_2$CH$_2$]SiCH$_3$(OCH$_3$)$_2$, [H$_2$NCH$_2$]Si(OCH$_3$)$_3$, [n-C$_4$H$_9$—HN—CH$_2$]Si(OCH$_3$)$_3$, [H$_2$N(CH$_2$)$_2$NH(CH$_2$)$_3$]Si(OCH$_3$)$_3$, H$_2$N(CH$_2$)$_2$NH(CH$_2$)$_3$Si(OCH$_2$CH$_2$OCH$_3$)$_3$, [CH$_3$NH(CH$_2$)$_2$NH(CH$_2$)$_3$]Si(OCH$_3$)$_3$, [H(NHCH$_2$CH$_2$)$_2$NH(CH$_2$)$_3$]Si(OCH 3)$_3$, HS(CH$_2$)$_3$Si(OCH$_3$)$_3$, NH$_2$CONH$_2$(CH$_2$)$_3$Si(OCH$_3$), or polyorganosiloxane oligomers, containing for example from 2 to 100 silicon atoms, containing such organic groups at a content of greater than 20%. Mention may also specifically be made of organosilicon compounds comprising at least one, preferably at least two, alkoxy groups bonded to a silicon atom, and at least one epoxy group.

According to a preferred embodiment, the silicone composition X according to the present invention does not contain an adhesion-promoting compound. In particular, the silicone composition X according to the present invention preferably does not contain any of the adhesion-promoting compounds individually mentioned above.

According to a preferred embodiment, the silicone composition X according to the invention comprises, based on the total weight of the silicone composition X:
- from 50% to 90%, preferably from 60% to 87%, of an organopolysiloxane A having, per molecule, at least two C$_2$-C$_6$ alkenyl groups bonded to the silicon,
- from 0.1% to 10%, preferably from 0.5% to 5%, of an organopolysiloxane B having, per molecule, at least two SiH units,
- from 2 ppm to 400 ppm, preferably from 5 ppm to 200 ppm, of a hydrosilylation catalyst C (calculated by weight of metal),
- from 5% to 20%, preferably from 8% to 18% of a filler D, preferably silica, optionally treated with a compatibilizer.

According to a particular embodiment, the silicone composition X further comprises:
- from 4% to 20%, preferably from 8% to 18%, of a monoalkenylated organopolysiloxane A'.

The percentages and ppm are percentages and ppm by weight. The amount by weight of catalyst C is calculated by weight of platinum metal.

Preferably, the silicone composition X has a dynamic viscosity of between 50 000 mPa·s and 300 000 mPa·s, more preferably of between 80 000 mPa·s and 200 000 mPa·s.

The silicone composition X may be prepared by mixing all the different components as described above.

According to one embodiment, the silicone composition X according to the invention can be prepared from a two-component system characterized in that it is in two separate parts intended to be mixed to form said silicone composition x, and in that one of the parts comprises the catalyst C and does not comprise the organopolysiloxane B, while the other part comprises the organopolysiloxane B and does not comprise the catalyst C.

Alternatively, the silicone composition X according to the invention can be a single-component system.

In a second step (b) of the method which is a subject of the present invention, said silicone composition X is deposited continuously or discontinuously on at least one face of said textile medium S.

The deposition can typically be carried out by transfer, dip roll or by spraying using a nozzle, a doctor blade, a rotating frame or a reverse roll. The thickness of the layer of silicone composition X deposited on the textile may be between 0.1 mm and 0.8 mm, preferably between 0.3 mm and 0.6 mm and more preferentially still between 0.4 mm and 0.5 mm.

Aside from the conventional coating methods, the deposition of the silicone composition X on at least one face of said textile medium S may be carried out by printing, typically using a printer. Those skilled in the art will be able to use any type of printing technology suited to the deposition of a silicone composition. Mention may for example be made of inkjet printing techniques, as described in application WO 2020/249694. Alternatively, a printing technique by extrusion can be used. The techniques and devices described for the 3D printing of silicone compositions, for example in application WO 2018/206689, are applicable to the deposition of silicone compositions according to the present invention, in so far as only a single layer or a small number of layers is deposited. It is possible to repeat the steps of deposition (b) and crosslinking (c) of the method according to the present invention a number of times if necessary, in order to obtain the desired form and thickness of the deposit.

Finally, in a third step (c) of the method which is a subject of the present invention, said silicone composition X is crosslinked by irradiation with UV radiation, the source of which is a UV-LED lamp. Said UV-LED lamp can emit radiation of a wavelength of 365 nm, 385 nm, 395 nm or 405 nm. Preferably, the UV-LED lamp is a lamp which emits at 365 nm.

The power of the UV-LED lamp is preferably between 2 W/cm$^2$ and 20 W/cm$^2$, more preferably between 5 W/cm$^2$ and 15 W/cm$^2$.

According to a preferred embodiment, the silicone composition X is irradiated continuously, by passing the textile medium S under the UV-LED lamp. The speed of passage and the number of passes can be defined such that the total irradiation of the silicone composition takes place for a duration of between 1 s and 60 s, more preferably between 2 s and 40 s, and even more preferably between 3 s and 15 s. Thus, the energy received by the silicone composition x by irradiation is preferably between 100 mJ/cm$^2$ and 5000 mJ/cm$^2$, more preferably between 500 mJ/cm$^2$ and 3500 mJ/cm$^2$, and even more preferably between 1200 mJ/cm$^2$ and 2500 mJ/cm$^2$.

According to a preferred embodiment, the crosslinking step (c) is carried out without inertization. However, this does not rule out performing the method under an inert atmosphere, for example under nitrogen, under argon or under low-oxygen air.

The crosslinking step (c) is carried out at a temperature of between 15° C. and 60° C., more preferably between 20° C. and 40° C., and even more preferably at ambient temperature, i.e. approximately 25° C.

The coated textile media thus obtained, as is or converted into textile items, can be used in a number of applications, for example in the field of clothing, particularly lingerie such as lace for tops, bottoms, or bras, and sports clothing, and hygiene items such as compression bandages or dressings.

Other details or advantages of the invention will become more clearly apparent in light of the examples given below solely by way of indication.

EXAMPLES

The silicone compositions described in the examples below were obtained from the following starting materials:
A1: Polydimethylsiloxane oil, vinylated at chain ends (a/w), having a vinyl group content of 0.07% by weight, viscosity at 25° C.=approximately 100 000 mPa·s;

A2: Polydimethylsiloxane oil, vinylated at chain ends (x/w), having a vinyl group content of 0.08% by weight, viscosity at 25° C.=approximately 60 000 mPa·s;

A3: Polydimethylsiloxane oil, vinylated at chain ends (a/@), having a vinyl group content of 0.11% by weight, viscosity at 25° C.=approximately 20 000 mPa·s;

A': Polydimethylsiloxane oil, monovinylated at one end, having a vinyl group content of 0.25% by weight, viscosity at 25° C.=approximately 1000 mPa·s;

B1: Poly(methylhydro)(dimethyl) siloxane oil having SiH groups in the middle of the chain and at the chain ends (a/w), having an SiH vinyl group content of 7.3% by weight, viscosity at 25° C.=approximately 30 mPa·s;

B2: Hydrodimethylpolysiloxane oil, having chain end SiH groups (a/w), having an SiH vinyl group content of 5.3% by weight, viscosity at 25° C.=approximately 8.5 mPa·s;

C1: Premix of Pt(acac)$_2$, sold by Johnson Matthey under the name Pt-70 (platinum content=49.0-49.8% by weight), at 2% in a mixture of dioxolane/polydimethylsiloxane oil, vinylated at chain ends (a/@) (50/50);

C2: Premix of PtCp* (i.e. trimethyl(methylcyclopentadienyl) platinum (IV)), sold by Umicore under the name HS161 (platinum content=61% by weight), at 5% in a polydimethylsiloxane oil, vinylated at chain ends (a/@);

C3: Karstedt's platinum catalyst, containing 10% by weight of platinum metal;

D1: fumed silica treated with a mixture of hexamethyldisilazane and divinyltetramethyl-1-disilazane;

D2: fumed silica treated with hexamethyldisilazane; Crosslinking inhibitor: 1-ethynyl-1-cyclohexanol (ECH).

Examples 1 to 4 and Comparative Examples 1 and 2

Silicone compositions were prepared according to table 1 below:

TABLE 1

| | Ex.1 | Ex.2 | Comp. Ex. 1 | Ex.3 | Ex. 4 | Comp. Ex. 2 |
|---|---|---|---|---|---|---|
| A1 | 57.7% | 57.7% | 57.7% | 57.8% | 57.8% | 57.8% |
| A2 | 13.5% | 13.5% | 13.5% | | | |
| A3 | | | | 26.3% | 26.1% | 26.1% |
| A' | 11.7% | 11.7% | 11.7% | | | |
| B1 | 0.45% | 0.45% | 0.45% | 1.6% | 1.6% | 1.6% |
| B2 | 1.62% | 1.62% | 1.62% | 0.3% | 0.3% | 0.3% |
| D1 | 15.0% | 15.0% | 15.0% | | | |
| D2 | | | | 14.0% | 13.9% | 13.9% |
| Catalyst | C1 amount of Pt metal = 13 ppm | C2 Amount of Pt metal = 13 ppm | C3 Amount of Pt metal = 13 ppm | C1 amount of Pt metal = 13 ppm | C2 Amount of Pt metal = 13 ppm | C3 Amount of Pt metal = 13 ppm |
| ECH | — | — | 0.023% | — | — | 0.023% |

The compositions were shaped:

1/ One portion was cast into a Teflon mold (dimensions: 13.6*13.6*0.2 cm) or a Teflon counter (d=60 mm, t=6 mm) to obtain plates and counters which were used for the mechanical hardness tests.

2/ Another portion was coated onto lace (0.4 mm layer) to evaluate blocking and adhesion.

For examples 1 to 4, the compositions thus shaped were subjected, at ambient temperature (approximately 25° C.), to UV irradiation on a UV test bench from IST (operating conditions: speed: 4 m/min; lamp: 365 LED; nm manufacturer power: 12 W/cm$^2$, no inertization of the product; approximately 5 to 10 passes under the lamp). Crosslinking took place for 5 to 10 s under the UV-LED lamp.

For comparative examples 1 and 2, the compositions were crosslinked by heating for 1 min at 130° C.

Characterization Tests:

Hardness: The hardness property was measured according to standard ISO 868 on a Bareiss BS61 durometer.

Blocking: Blocking is an application test which makes it possible to determine the force needed to detach coated lace which is folded over on itself. This test is indicative of finalized crosslinking. The blocking was evaluated by tensile testing on the lace using a Zwick dynamometer.

Adhesion: The adhesion test is performed by a test of elongation of the lace. A length of 100 mm is stretched using a Zwick dynamometer with a force of 70 N and returned to the initial state. The cycle is repeated 25 times and macroscopic observation is performed to evaluate the attachment of the silicone to the lace.

The results are presented in table 2 below:

TABLE 2

| Test | Ex.1 | Ex.2 | Comp. Ex. 1 | Ex.3 | Ex. 4 | Comp. Ex. 2 |
|---|---|---|---|---|---|---|
| Hardness (Sh A) | 4 | (not measured) | 4 | 15 | 15 | 15 |
| Blocking (N) | 10.86 | 3.21 | 2.54 | 9.24 | 1.84 | 1.09 |
| Adhesion | No detachment of the silicone from the lace. No degradation of the coatings after 25 cycles of stretching at 70N. | | | | | |

In terms of hardness and adhesion, it is observed that the results are equivalent whether the crosslinking is thermal (comparative examples 1 and 2) or under UV-LED (examples 1 to 4).

Regarding blocking, the results obtained with the catalyst C2 (examples 2 and 4) are identical to the results obtained with conventional catalyst C3 (comparative examples 1 and 2). However, the crosslinking took place for 5 to 10 s under the UV-LED lamp in examples 2 and 4, as opposed to 1 min at 130° C. in comparative examples 1 and 2, which constitutes a significant advantage in terms of productivity, energy used and compatibility with lace media. Examples 1 and 3 present blocking values which are slightly higher but which are nonetheless acceptable for the desired application, and could be improved by longer irradiation.

The invention claimed is:

1. A method for coating a silicone composition X which is crosslinkable by polyaddition reaction to form a silicone elastomer on an open-work and/or elastic textile medium S, comprising a), b) and c):
   a) a silicone composition X which is crosslinkable by polyaddition reactions is provided, comprising:
      at least one organopolysiloxane A having, per molecule, at least two $C_2$-$C_6$ alkenyl groups bonded to the silicon,
      at least one organopolysiloxane B having, per molecule, at least two SiH units, and
      a catalytically effective amount of at least one hydrosilylation catalyst C, which is activatable by UV irradiation, b) said silicone composition X is deposited continuously or discontinuously on at least one face of said textile medium S, and c) said silicone composition X is crosslinked by irradiation with UV radiation, a source of which is a UV-LED lamp.

2. The method as claimed in claim 1, wherein the textile medium S is a lace or an elastic strip.

3. The method as claimed in claim 1, wherein the silicone composition X further comprises at least one organopolysiloxane compound A' having, per molecule, a single $C_2$-$C_6$ alkenyl group bonded to the silicon.

4. The method as claimed in claim 1, wherein the silicon composition X additionally comprises a filler D, optionally a mineral filler of silica type.

5. The method as claimed in claim 1, wherein the silicone composition X:

does not contain any crosslinking inhibitor; optionally, does not contain I-ethynyl-1-cyclohexanol (ECH); and/or does not contain any adhesion-promoting compound.

6. The method as claimed in claim 1, wherein the silicone composition X comprises, based on the total weight of the silicon composition X:

from 50% to 90%, optionally from 60% to 87%, of an organopolysiloxane A having, per molecule, at least two $C_2$-$C_6$ alkenyl groups bonded to the silicon, from 0.1% to 10%, optionally from 0.5% to 5%, of an organopolysiloxane B having, per molecule, at least two SiH units, from 2 ppm to 400 ppm, optionally from 5 ppm to 200 ppm, of a hydrosilylation catalyst C (calculated by weight of metal), from 5% to 20%, optionally from 8% to 18% of a filler D, optionally silica, optionally treated with a compatibilizer and optionally from 4% to 20%, optionally from 8% to 18%, of an organopolysiloxane A' having, per molecule, a single $C_2$-$C_6$ alkenyl group bonded to the silicon.

7. The method as claimed in claim 1, wherein the UV-LED lamp used during irradiation (c) emits radiation having a wavelength of 365 nm, 385 nm, 395 nm or 405 nm, optionally 365 nm.

8. The method as claimed in claim 1, wherein the crosslinking (c) is carried out at a temperature of between 15° C. and 60° C., optionally between 20° C. and 40° C., and optionally at ambient temperature.

9. A textile medium S coated on at least one face with a silicone elastomer which can be obtained by the method as defined in claim 1.

10. A product comprising the coated textile medium S as claimed in claim 9 in the field of clothing, optionally lingerie optionally lace for one or more of tops, bottoms, or bras, and/or sports clothing, hygiene items, and/or medical devices, optionally compression bandage or dressing.

* * * * *